United States Patent
Olbricht

(10) Patent No.: US 6,429,952 B1
(45) Date of Patent: Aug. 6, 2002

(54) BROWSER INTERFACE TO SCANNER

(75) Inventor: Eric Thomas Olbricht, Vancouver, WA (US)

(73) Assignee: Sharp Laboratories Of America, Camas, WA (US)

( * ) Notice: Subject to any disclaimer, the term of this patent is extended or adjusted under 35 U.S.C. 154(b) by 0 days.

(21) Appl. No.: 09/144,573

(22) Filed: Aug. 31, 1998

(51) Int. Cl.[7] .................................................. H04N 1/32
(52) U.S. Cl. ........................ 358/442; 358/468; 358/474
(58) Field of Search .............................. 358/474, 475, 358/468, 442, 406, 438, 439

(56) References Cited

U.S. PATENT DOCUMENTS

| | | |
|---|---|---|
| 4,894,522 A | 1/1990 | Elliot |
| 5,157,773 A | 10/1992 | Matsumoto et al. |
| 5,432,914 A | 7/1995 | Cho |
| 5,438,648 A | 8/1995 | Takaoka et al. |
| 5,508,821 A | 4/1996 | Murata |
| 5,532,844 A | 7/1996 | Kagami et al. |
| 5,572,642 A | 11/1996 | Judson |
| 5,694,594 A | 12/1997 | Chang |
| 5,869,819 A * | 2/1999 | Knowles ...................... 235/375 |
| 6,101,509 A * | 8/2000 | Hanson et al. .............. 707/513 |
| 6,152,369 A * | 11/2000 | Wilz, Sr. et al. ........ 235/462.01 |

FOREIGN PATENT DOCUMENTS

JP        10135942    * 5/1998    ............. H04L/9/08

* cited by examiner

Primary Examiner—Jerome Grant, II
(74) Attorney, Agent, or Firm—Robert D. Varitz, P.C.

(57) ABSTRACT

A system for interfacing a browser and a scanner includes a computer terminal having a browser loaded thereon; a communications network connected to the computer terminal; a HTTP server connected to the communications network; and a scanning device connected to the HTTP server, wherein the scanning device is controlled by the browser on the computer terminal, and wherein a data stream generated by the scanning device is transmitted to the browser and is manipulated thereby. A scanning device is controlled with a browser residing in a computer terminal includes loading the browser on the computer terminal, wherein the computer terminal is connected to the scanning device; setting scanning parameters for the scanning device from the browser; commanding the scanning device to scan an object, thereby creating a data stream representative of the scanned object; and manipulating the data stream with the browser.

9 Claims, 2 Drawing Sheets

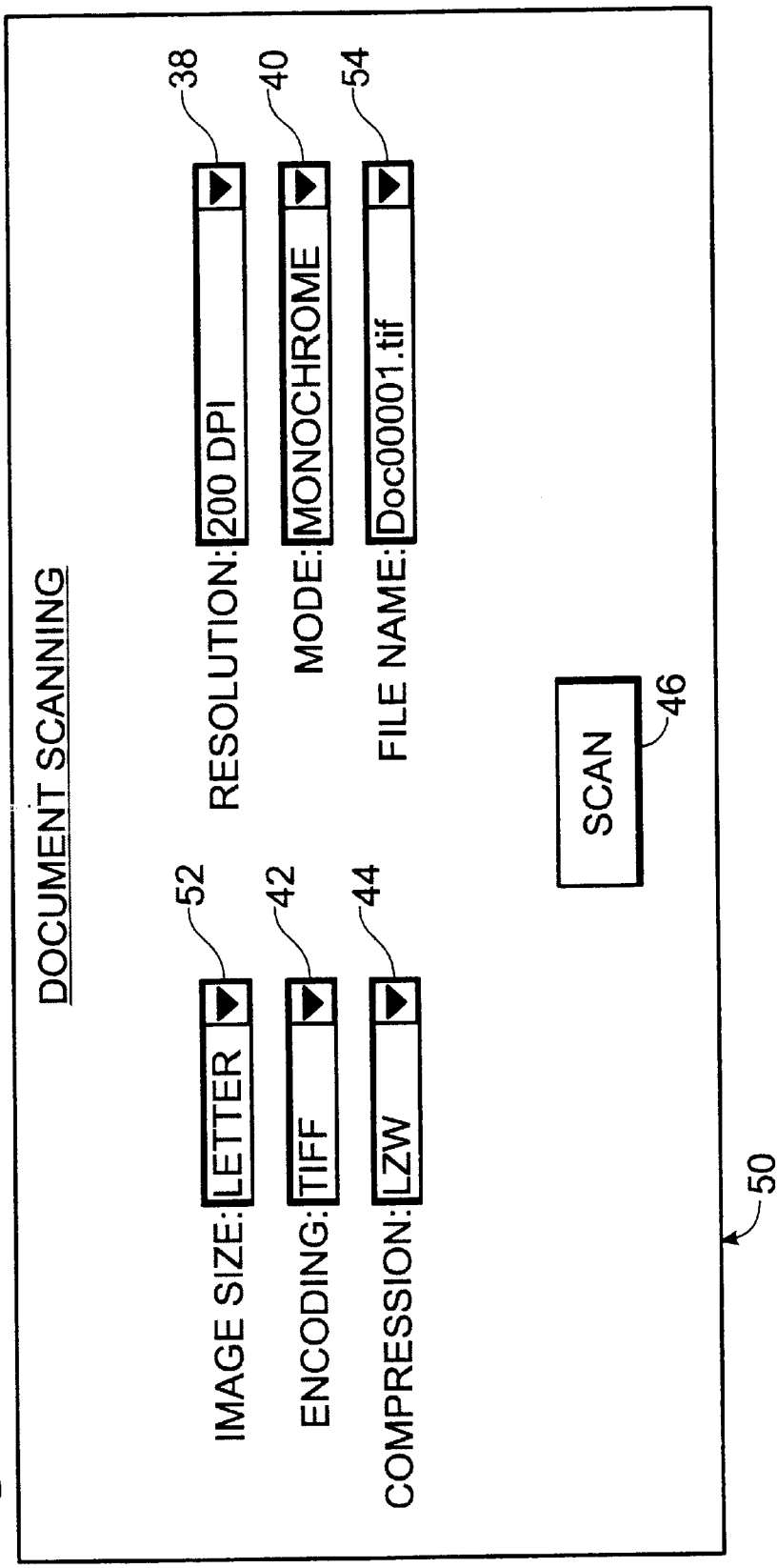

BROWSER INTERFACE TO SCANNER

FIELD OF THE INVENTION

This invention relates to the user interface, control interface and network interface for a still image input device, such as a scanner.

BACKGROUND OF THE INVENTION

To date there has been no general purpose interface for scanners. Scanners have used proprietary applications and drivers to provide user interfaces and device control. Scanners have also used special purpose protocols (TWAIN, ISIS) to transfer data and control. Some scanner interfaces make use of EMail and shared directories for the transfer of the scanned data, but they do not offer any control of the scanning hardware.

Chang, U.S. Pat. No. 5,694,594, "System for Linking Hypermedia Data Objects in Accordance with Associations of Source and Destination Data Objects and Similarity Threshold without using Keywords or Link-defining Terms," Dec. 2, 1997, discloses a system having multiple, linked-together, processor-database units.

Judson, U.S. Pat. No. 5,572,643, "Web Browser with Dynamic Display of Information Objects During Linking," Nov. 5, 1996, discloses a system for retrieving a document on a remote server while connected to a primary server.

Kagami, et al, U.S. Pat. No. 5,532,844, "Image Data Transferring System and Method," Jul. 2, 1996, discloses a technique for controlling a scanning device from a printer port on a terminal.

Murata, U.S. Pat. No. 5,508,821, "Image Scanner and Image Forming Apparatus with an Interface for Connection with an External Computer," Apr. 16, 1996, discloses a scanner having a small computer interface incorporated therein.

Takaoka et al., U.S. Pat. No. 5,438,648, "Image Interface Device," Aug. 1, 1995, discloses an interface for use between a scanner, a printer and a computer.

Cho, U.S. Pat. No. 5,432,914, "Scanner Interface System for Transferring Data to Main and Secondary Processing Units," Jul. 11, 1995, discloses the use of a scanner and a buffer memory to facilitate use of scanned data by a microprocessor in a computer.

Matsumoto et aL, U.S. Pat. No. 5,157,773, "Image Data Output Apparatus," Oct. 20, 1992, discloses an apparatus for changing the format of a scanned image.

Elliott, U.S. Pat. No. 4,894,522, "Interface apparatus," Jan. 16, 1990, discloses a hardware solution enabling a computer to act as a host for a scanner.

SUMMARY OF THE INVENTION

A system for interfacing a browser and a scanner includes a computer terminal having a browser loaded thereon; a communications network connected to the computer terminal; a HTTP server connected to the communications network; and a scanning device connected to the HTTP server, wherein the scanning device is controlled by the browser on the computer terminal, and wherein a data stream generated by the scanning device is transmitted to the browser and is manipulated thereby.

A method of controlling a scanning device with a browser residing in a computer terminal includes loading the browser on the computer terminal, wherein the computer terminal is connected to the scanning device; setting scanning parameters for the scanning device from the browser; commanding the scanning device to scan an object, thereby creating a data stream representative of the scanned object; and manipulating the data stream with the browser.

An object of the invention is to provide a method and system which will allow a user directly to import a scanned object into a browser.

Another object of the invention is to provide a method and system which will allow a user to control a scanning device from a browser loaded on a computer terminal.

These and other objects and advantages of the invention will become more fully apparent as the description which follows is read in conjunction with the drawings.

BRIEF DESCRIPTION OF THE DRAWINGS

FIG. 3 is an example of an HTML page implementation for the document mode of the invention.

DETAILED DESCRIPTION OF THE PREFERRED EMBODIMENT

This invention makes use of a browser already loaded on a user's terminal to integrate control of a scanner and transfer of data generated by the scanning process into a form readable by the browser. The invention centralizes the user interface within the scanning device so that unique features may be exploited without the modification of host drivers. Because the interface and data transfer utilize the standard browser interface, the scanner may be used on any host platform without special drivers, which are usually required to be located on a terminal using the scanned data. This method of image input is especially useful for generating "HTML Ready", i.e., sized and encoded for the HTML (Hyper-Text Markup Language) browser, art work which may be imported directly into HTML authoring tools that accompany most browsers.

The browser-to-scanner interface is intended to create an intuitive user interface for a still image input device, such as a scanner. The invention uses an industry standard HTML browser, such as Microsoft Explorer® or Netscape Navigator®, to allow a user to configure and control a scanner, scan a document, and save the scanned image to a file. The invention may be used with single images and multiple page documents. The invention uses HTTP (Hyper-Text Transport Protocol) as the data transfer mechanism. The invention may be used for the control of a network-connected scanning device as well as with a local scanner.

Figure 1:
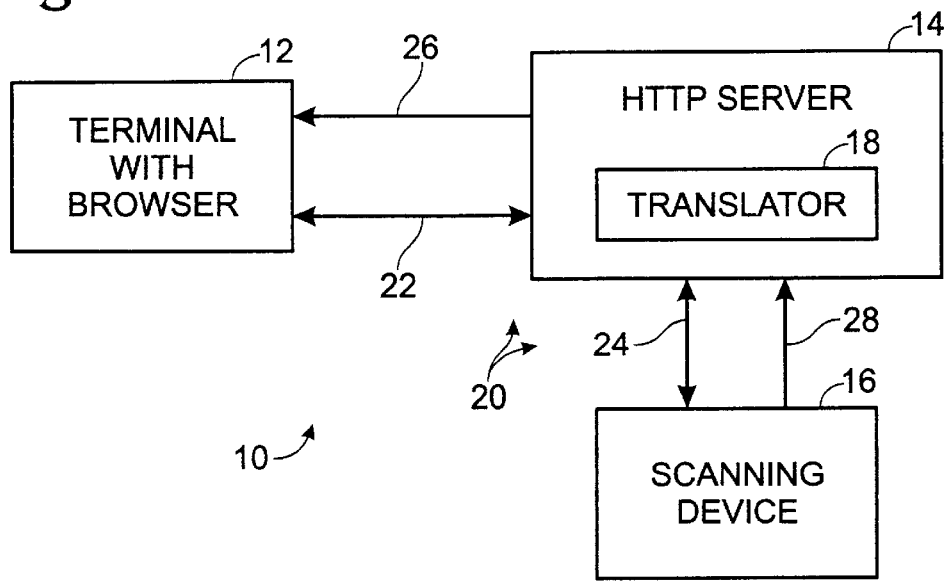
FIG. 1 is a block diagram of the system of the invention.

Referring now to FIG. 1. the system of the invention is depicted generally at 10. System 10 includes a computer terminal 12, which has a browser loaded therein. A HTTP server 14 is provided between terminal 12 and a controlled device 16, which, in the preferred embodiment is a scanning device. Server 14 may be incorporated into device 16. An image-to-image translator 18 is provided within server 14, if required, to transform image code generated by device 16 into a format usable by the browser in terminal 12. Such transformation may be explicit conversion if server 14 is separate from device 16. The transformation may be inherent if server 14 is part of device 16.

An object to be scanned, such as a page of text, a page containing text and images, or a page containing an image, is placed in the scanning device. Terminal 12 is connected to server 14 over a communications network, shown generally at 20. Network 20 includes control paths 22, 24, which are bi-directional paths, and data paths 26, 28, which flow from device 16 to server 14 to terminal 12. Network 20 may be a LAN, a WAN, or a simple connection directly from terminal 12 to server 14.

The system may be adjusted to scan graphics or documents. Possible scanning parameters include the following, some of which are applicable to both graphic and document scanning, while others are applicable to only graphic or document scanning:

Resolution: 300 dpi/600 dpi/1200 dpi . . .
Image Size: letter/legal/A4/dimensional
Mode 1: Color/Monochrome
Mode 2: Single/Multiple Page
Encoding: TIFF/TIFF-F/JPEG/GIF
Compression: LZW/CCITT
File Name: user designated The system may display, on terminal 12, a unique page for graphics scanning and a different page for document scanning. The graphics scanning mode supports the scanning of a single page only and optionally presents a preview of the image to allow adjustment of the scanning parameters. This mode is primarily to be used to scan cropped color images.

In the method of the invention, the user enters the internet protocol (IP) address, or URL (uniform resource locator), of the scanner into the web browser. The browser retrieves an HTML-format page from the scanner. The page is displayed to the user with a set of configuration parameters, which may include a "Preview" of the image. The user selects the desired parameters and clicks the "Scan" button. The device then scans the image(s) and generates a data stream representative of the scanned image in the form of a file. The file is returned to the user via the browser interface. The user may view the image from within the browser, and/or optionally may save the file via the browser. Some devices, such as scanners, may output data in HTML format, or in some other format that is compatible with the browser, however, the system and method of the invention allow a user to control the device through the browser software of terminal 12 by selecting various scanning parameters.

Figure 2:
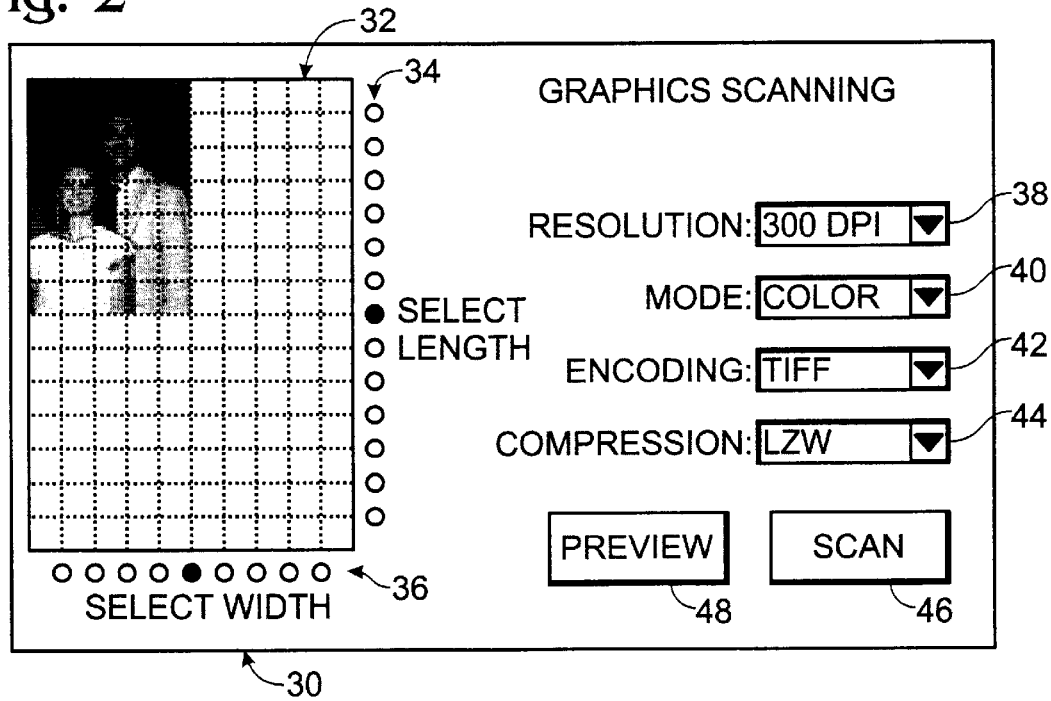
FIG. 2 is an example of an HTML page implementation for the graphics mode of the invention.

Referring now to FIG. 2, a possible HTML page implementation for the graphics mode is depicted generally at 30. Page 30 includes a sizing grid 32, having adjustments for length 34 and width 36. If implemented in Java®, slide bars may be provided to allow infinite adjustment increments. The user enters an appropriate resolution 38, a mode 40, the type of encoding to be used 42, and the compression type 44. When the object to be scanned is properly placed in the scanner, a "Scan" button 46 is clicked. The user may also select the "Preview" option, button 48. For graphics, the file name is identified using the "Save As" command in the browser. Translator 18 may be provided with industry standard image-to-image conversion software to convert output from device 16 to a format readable by the browser in terminal 12. Scanners generally provide output in a TIF data stream. Appropriate software may be provided in translator 18 to convert such a data stream to a GIF or JPEG format. As compression problems may be encountered with the JPEG format, GIF may be a more desirable output format from translator 18. Translator 18 may be browser specific if the browser is capable of handling only certain types if image files as input, i.e., if the browser will only read GIF image files, translator 18 may be constructed and arranged to provide only GIF files as its output.

Referring now to FIG. 3, a HTML page implementation for the document scanning mode is depicted generally at 50, and may include an image size selector 52 and a file name designator 54. The other options are as previously described in connection with the graphics mode. The document scanning mode supports the scanning of single or multiple page documents. It does not present the user with a preview. This mode is used to scan full page documents at a lower resolution.

The invention may present Java® applets in place of the HTML pages. The use of Java® allows for a more refined user interface. The interface presents better graphics and also perform error checking on the configuration parameters, i.e., it may be illegal to select 1200 dpi resolution when the color mode is selected. In the event that selection of one feature eliminates choices in another feature, the other feature selection box may be set to "fade" or go "grey."

As previously noted, the system and method of the invention does not require that terminal 12 have device-specific drivers for device 16 loaded thereon, as is required by conventional systems. This may clear significant memory space on terminal 12, and/or eliminate the need to license device-specific drivers from the device manufacturers.

An alternate embodiment of the invention includes an HTTP server that is added to the firmware of the device to be controlled. The device must have sufficient connectivity to support the HTTP interface, an IP capable network interface or a bi-directional direct connection. The server is integrated into the device in such a way that it may control the scanner and translate the data. In an alternative embodiment of the invention, an intermediate host acts as the HTTP server and the intermediate host translates the commands and data for the device.

Although a preferred embodiment of the system and method of the invention have been disclosed, and a variation thereof, it will be appreciated that further variations and modifications may be made thereto without departing from the scope of the invention as defined in the appended claims.

I claim:

1. A system for interfacing a browser and a scanner comprising:

a computer terminal having a browser loaded thereon;

a communications network connected to said computer terminal;

a HTTP server connected to said communications network; and a scanning device connected to said HTTP server, wherein said scanning device is controlled by said browser on said computer terminal, and wherein a data stream generated by said scanning device is transmitted to said browser and is manipulated thereby.

2. The system of claim 1 wherein said HTTP server is integrally constructed within said scanning device.

3. The system of claim 1 wherein said HTTP server includes an image-to-image translator.

4. The system of claim 3 wherein said translator is browser specific.

5. The system of claim 1 wherein said computer terminal controls said scanning device without having a scanning device-specific driver loaded thereon.

6. A method of controlling a scanning device with a browser residing in a computer terminal comprising:

loading the browser on the computer terminal, wherein the computer terminal is connected to the scanning device;

setting scanning parameters in a user interface for the scanning device from the browser;

commanding the scanning device to scan an object, thereby creating a data stream representative of the scanned object; and manipulating the data stream with the browser.

7. The method of claim 6 wherein said creating a data stream includes generating a data stream in a HTML-type format for direct use by the browser.

8. The method of claim 6 wherein the user interface is presented in a JAVA®-type format.

9. The method of claim 6 wherein said commanding includes setting commands taken from the group of commands including setting resolution, setting an image size, setting a color/monochrome mode, setting a single/multiple page mode, setting and encoding type, setting a compression type and assigning a file name.

* * * * *